(12) United States Patent
De Wergifosse et al.

(10) Patent No.: US 12,212,275 B2
(45) Date of Patent: Jan. 28, 2025

(54) PUMP ACTUATING DEVICE, AND ASSOCIATED PUMPING SYSTEM, AIRCRAFT AND FUEL SUPPLY METHOD

(71) Applicant: SAFRAN AIRCRAFT ENGINES, Paris (FR)

(72) Inventors: Huguette De Wergifosse, Moissy-Cramayel (FR); Clément Dupays, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 125 days.

(21) Appl. No.: 18/246,905

(22) PCT Filed: Sep. 28, 2021

(86) PCT No.: PCT/FR2021/051668
§ 371 (c)(1),
(2) Date: Mar. 28, 2023

(87) PCT Pub. No.: WO2022/069828
PCT Pub. Date: Apr. 7, 2022

(65) Prior Publication Data
US 2023/0361699 A1    Nov. 9, 2023

(30) Foreign Application Priority Data

Sep. 29, 2020 (FR) ...................... 2009935

(51) Int. Cl.
*H02P 9/42* (2006.01)
*F02C 7/22* (2006.01)
(Continued)

(52) U.S. Cl.
CPC ................. *H02P 9/42* (2013.01); *F02C 7/22* (2013.01); *F02C 9/30* (2013.01); *F05D 2220/76* (2013.01);
(Continued)

(58) Field of Classification Search
CPC .... H02P 9/42; H02P 2101/25; H02P 2101/30; H02P 2103/10; H02P 2103/20; F02C 7/22; F02C 9/30; F05D 2220/76
See application file for complete search history.

(56) References Cited

U.S. PATENT DOCUMENTS

| 8,319,481 B2 * | 11/2012 | Lemmers | .................. H02P 9/42 |
| | | | 322/89 |
| 2009/0199823 A1 | 8/2009 | Mahoney et al. | |

(Continued)

FOREIGN PATENT DOCUMENTS

| EP | 2 088 302 A2 | 8/2009 |
| EP | 2 940 272 A1 | 11/2015 |
| FR | 2 934 321 A1 | 1/2010 |

OTHER PUBLICATIONS

International Search Report & Written Opinion mailed on Jan. 24, 2022 in PCT/FR2021/051668 filed on Sep. 28, 2021 (16 pages).

*Primary Examiner* — Zoheb S Imtiaz
(74) *Attorney, Agent, or Firm* — Oblon, McClelland, Maier & Neustadt, L.L.P.

(57) ABSTRACT

An actuating device of a pump of a fuel pumping system of an engine, including a motor, a generator, an inverter, a switching member and a control member, the motor including a first rotor coupled to the pump and a first stator including at least one input stator winding, the generator including a second rotor coupled to a drive shaft of the engine, and a second stator including at least one output stator winding, the control member being configured to control the switching member in order to selectively connect each input stator winding: to a corresponding output stator winding if a speed of the engine is higher than or equal to a predetermined speed; to a corresponding output of the inverter, otherwise.

10 Claims, 2 Drawing Sheets

(51) Int. Cl.
*F02C 9/30* (2006.01)
*H02P 101/25* (2016.01)
*H02P 101/30* (2015.01)
*H02P 103/10* (2016.01)
*H02P 103/20* (2016.01)

(52) U.S. Cl.
CPC ...... *H02P 2101/25* (2015.01); *H02P 2101/30* (2015.01); *H02P 2103/10* (2015.01); *H02P 2103/20* (2015.01)

(56) References Cited

U.S. PATENT DOCUMENTS

2010/0018182 A1 1/2010 Bader et al.
2015/0315980 A1 11/2015 Edwards et al.
2016/0094176 A1* 3/2016 Tolksdorf ............... H02P 27/05
310/198

* cited by examiner

PUMP ACTUATING DEVICE, AND ASSOCIATED PUMPING SYSTEM, AIRCRAFT AND FUEL SUPPLY METHOD

TECHNICAL FIELD

The present invention relates to an actuating device intended to drive at least one pump of a fuel pumping system of a fuel circuit towards a fuel injection device of an engine.

The invention also relates to a pumping system, an aircraft carrying such a pumping system, and a fuel supply method for such an aircraft.

The invention applies to the field of aeronautics, in particular to the fuel supply of an aircraft engine.

PRIOR ART

It is known to use, on board an aircraft, at least one pump to convey fuel from a fuel tank of the aircraft to a fuel injection device of an engine of the aircraft. Such a pump, generally a volumetric pump, is conventionally actuated by means of a hydraulic circuit of the aircraft.

In the context of the electrification of some aircraft actuators, including the fuel delivery lines, it has been proposed to drive the previously-described pump by means of a rotating electric machine. More specifically, it has been proposed to provide a first rotating electric machine, called "generator", and a second rotating electric machine, called "motor", electrically connected to each other. In this case, the output shaft of the motor is coupled to the pump for driving thereof, and the shaft of the generator is coupled to a shaft of the engine of the aircraft. The generator and the motor are typically three-phase machines, in particular an asynchronous machine for the motor and an asynchronous or synchronous machine for the generator. In this manner, during the operation of the engine of the aircraft, the generator delivers currents whose frequency is proportional to the rotational speed of the engine of the aircraft (also called "speed"). It follows that the rotational speed at the output of the motor is proportional to the speed of the engine (within some slip margin), so that the pump is brought to deliver fuel with a flow rate proportional to the speed of the engine.

Nonetheless, such a pump actuating device is not fully satisfactory.

Indeed, for the engine to be properly supplied with fuel regardless of its speed, the pump driven by such an actuating device is dimensioned so that, for any given speed, the flow rate supplied by the pump is at least equal to the flow rate required by the engine for said speed. In general, such sizing consists in selecting a pump with an appropriate displacement.

Yet, as illustrated by FIG. 1, the curve 2 of evolution of the fuel flow rate required by the engine as a function of its speed is generally a concave increasing curve. In this case, the displacement is imposed by the operating point that has the highest ratio between the required fuel flow rate and the speed of the engine, amongst the lowest speed operating point (corresponding to an autorotation phase of a fan of the engine, or "windmilling"), illustrated by point 4, and the highest speed operating point (corresponding to a take-off phase, or "take-off"), illustrated by the point 6.

In the case where the displacement is imposed by the lowest speed operating point 4, the fuel flow rate supplied by the pump, symbolised by the line 8 which passes through the lowest speed operating point 4, is always higher than the fuel flow rate required by the engine. For example, at the highest speed operating point 6, the excess fuel flow rate is symbolised by the arrow 10. In this case, the installation of a fuel recirculation device is necessary.

During its operation, such a recirculation device, generally connected at the output of a gearbox of the engine, draws mechanical power at the output of said gearbox, and dissipates a portion of the drawn mechanical power in the form of heat. Yet, such heat dissipation is detrimental because the fuel circuit (which comprises the injection device) is used as a cold source for the oil circuit. Any heat dissipation has a negative impact on the size of the exchangers.

Hence, the invention is intended to provide a pump actuating device which, for any given operating point of the engine, results in a smaller discrepancy between the fuel flow rate required for said operating point and the fuel flow rate supplied by the pump, i.e. which reduces the need for fuel recirculation.

DISCLOSURE OF THE INVENTION

To this end, an object of the invention is a fuel actuating device of the aforementioned type, including a motor rotating electric machine, a generator rotating electric machine, an electrical energy inverter, a switching member and a control member,
- the motor rotating electric machine comprising a first rotor, intended to be mechanically coupled to the at least one pump for actuation thereof, and a first stator comprising at least one input stator winding,
- the generator rotating electric machine comprising a second rotor, intended to be mechanically coupled to a shaft of the engine forming a drive shaft, and a second stator comprising at least one output stator winding, each output stator winding being associated to a respective input stator winding of the motor rotating electric machine,
- the inverter comprising at least one output, each output of the inverter being associated to a respective input stator winding of the motor rotating electric machine,
- the control member being configured to receive speed information relating to a speed of the engine, and to control the switching member in order to selectively connect each input stator winding of the motor rotating electric machine:
  - to the corresponding output stator winding if the speed of the engine is higher than or equal to a predetermined speed;
  - at the corresponding output of the inverter, otherwise.

Indeed, such an actuating device allows selecting the highest speed operating point for the sizing of the pump (in particular for the selection of its displacement), even when the highest ratio between the required fuel flow rate and the speed of the engine corresponds to the lowest speed operating point. In this case, by its action on the switching member, the control member authorises two distinct operating modes:
- for a speed higher than or equal to the speed associated to a predetermined operating point, called "switching" operating point, the motor rotating electric machine is connected to the generator rotating electric machine so as to be driven at a rotational speed proportional to the speed of the engine; and
- below the speed associated to the switching point, the motor rotating electric machine is connected to the converter, capable of being controlled according to a control law suitable for rotating the motor rotating electric machine in order to be driven at a rotational speed sufficient to supply the engine with fuel with, for each operating point below the switching point, a fuel flow rate at least equal to the fuel flow rate required for said operating point.

In particular, the switching point corresponds to the point of intersection between, on the one hand, the curve of the fuel flow rate required by the engine as a function of its speed, and, on the other hand, the line representative of the linear function relating the fuel flow rate delivered by the pump resulting from sizing with the speed of the engine.

It arises from the foregoing that, thanks to the actuating device according to the invention, the discrepancy between the fuel flow rate required for any given operating point of the engine of the aircraft and the fuel flow rate supplied by the pump is less significant than that obtained by means of known actuating devices. Hence, the fuel recirculation need is significantly reduced.

According to other advantageous aspects of the invention, the actuating device includes one or more of the following features, considered separately or in any technically-possible combination:

- the motor rotating electrical machine is an asynchronous machine, and/or the generator rotating electric machine is a permanent magnet synchronous machine or an asynchronous machine;
- the control member is configured to control the operation of the inverter according to a predetermined control law dependent of the speed of the engine;
- the control member is configured to receive speed information relating to a current drive speed at which each pump is driven, the control member also being configured, when the speed of the engine is lower than the predetermined speed, to:
- compare the current drive speed with a predetermined target drive speed;
- control the inverter in order to deliver, for each corresponding input stator winding, a voltage whose frequency and amplitude depend, each, on a difference between the current drive speed and the target drive speed;
- the target drive speed follows a predetermined time profile, or is a predetermined constant;
- the control member is configured to control the inverter according to a so-called "V to f" control law;
- the control member is configured to control the inverter so that a frequency of a power supply voltage of the motor rotating electric machine delivered by the inverter has a predetermined evolution over time.

Furthermore, an object of the invention is a fuel pumping system comprising at least one pump and an actuating device as defined hereinabove, the first rotor of the motor rotating electric machine being mechanically coupled to each pump for its actuation thereof.

Furthermore, an object of the invention is an aircraft carrying a fuel pumping system as defined hereinabove, each pump being inserted between a fuel circuit of the aircraft and a fuel injection member of an engine of the aircraft, the second rotor of the generator rotating electric machine being mechanically coupled to a shaft of the engine.

Another object of the invention is a method of supplying fuel to an engine of an aircraft as defined hereinabove, the supply method including the selective connection of each input stator winding of the motor rotating electric machine:

- to the corresponding output stator winding if the speed of the engine is higher than or equal to a predetermined speed;
- to the corresponding output of the inverter, otherwise.

BRIEF DESCRIPTION OF THE DRAWINGS

The invention will be better understood from the following description, given only as a non-limiting example and made with reference to the appended drawings wherein.

DETAILED DISCLOSURE OF PARTICULAR EMBODIMENTS

Figure 2:
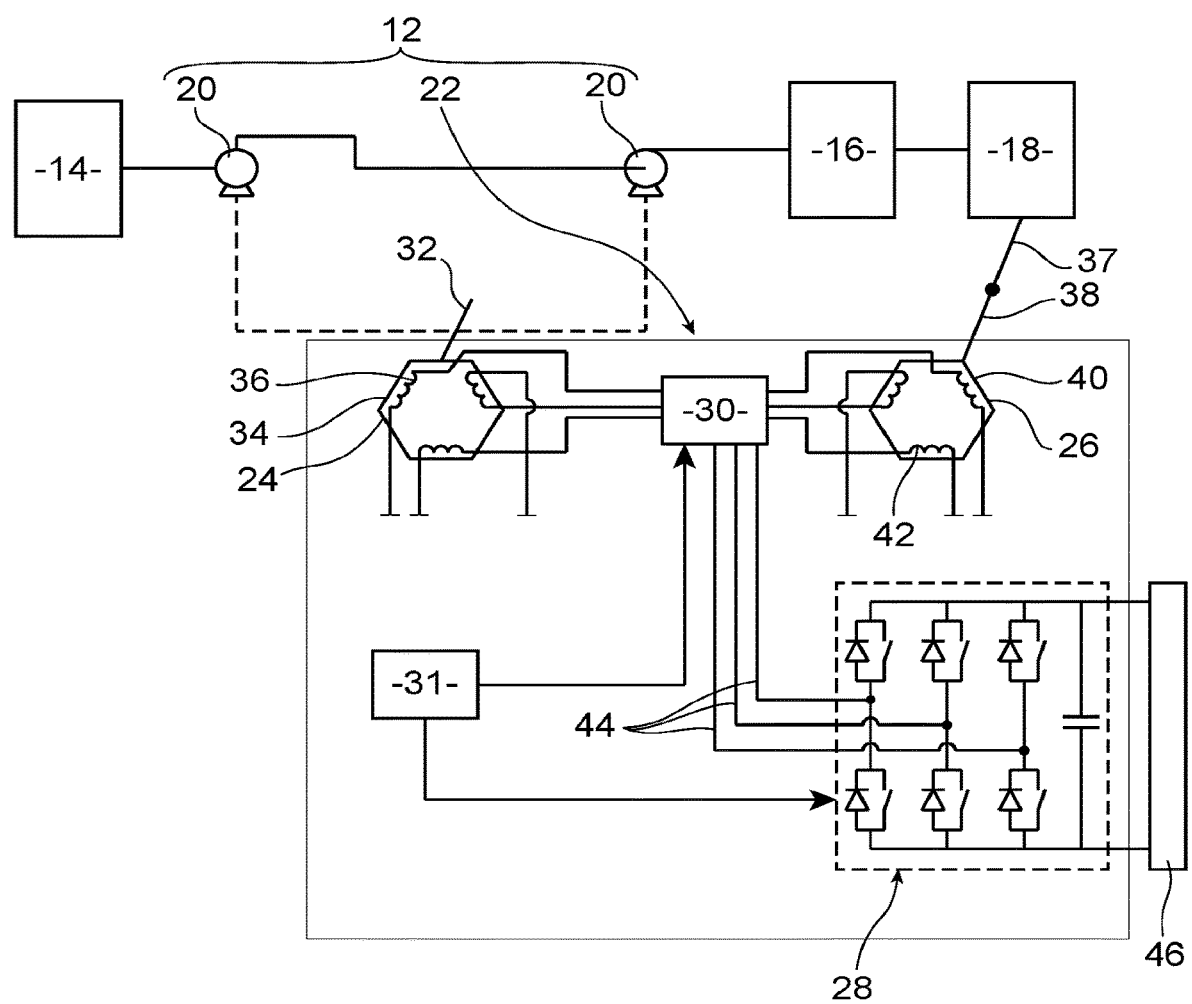
FIG. 2 is a schematic representation of a pumping system according to the invention.

A fuel pumping system 12, in particular for an aircraft engine, according to the invention is illustrated by FIG. 2.

The pumping system 12 is intended to convey fuel from a fuel tank 14 of an aircraft (not represented) towards a fuel injection device 16 of an engine 18 of the aircraft.

More specifically, the pumping system 12 includes at least one pump 20, intended to be arranged between the fuel tank 14 and the injection device 16, and an actuating device 22 to drive the or each pump 20.

The actuating device 22 includes a motor rotating electric machine 24 (called "motor"), a generator rotating electric machine 26 (called "generator"), an inverter 28, a switching member 30 and a control member 31.

The motor 24 is configured to receive electrical energy from the generator 26 or from the inverter 28, and to convert the received electrical energy into mechanical energy intended to actuate the or each pump 20.

The motor 24 comprises a rotor 32 (called "first rotor") and a stator 34 (called "first stator").

The first rotor 32 is mechanically coupled to at least one pump 20 to cause actuation thereof.

The first stator 34 includes at least one winding 36, called "input stator winding", for example three input stator windings 36.

As will be described later on, each input stator winding 36 of the motor 24 is associated with both an output stator winding 42 of the generator 26, and an output 44 of the inverter 28.

The generator 26 is configured to draw mechanical energy from a shaft 37 of the engine 18 (so-called "drive shaft"), and to convert the drawn mechanical energy into electrical energy. For example, the drive shaft 37 is the low-pressure shaft of the engine 18.

The generator 26 comprises a rotor 38 (called "second rotor") and a stator 40 (called "second stator").

The second rotor 38 is mechanically coupled to the drive shaft of the motor by means of any suitable transmission mechanical member such as a reduction gear.

The second stator 40 includes at least one winding 42, called "output stator winding", for example three output stator windings 42. Each output stator winding 42 is associated to a respective input stator winding 36.

The motor 24 is an asynchronous machine. Furthermore, the generator 26 is preferably a permanent magnet synchronous machine or an asynchronous machine.

The inverter 28 includes a plurality of outputs 44, each associated to a respective input stator winding 36 of the motor 24. Furthermore, the inverter 28 is connected, at the input, to an on-board electrical energy source 46.

The inverter 28 is configured to draw electrical energy from the on-board source 46, and to supply, at each of its outputs 44, from the drawn electrical energy, a current having predetermined characteristics.

In particular, the on-board source 44 is a DC voltage bus of the aircraft, or an AC network of the aircraft coupled to a rectifier. A three-phase voltage inverter is then added, whose power switches are controlled so as to start the machine and then drive it at a predetermined fixed speed.

The operation of the inverter 28, and in particular its control law, will be detailed more specifically later on.

The switching member 30 is connected at the input to each output stator winding 42 of the generator 26 and to each output 44 of the inverter 28. Furthermore, the switching member 30 is connected, at the output, to each input stator winding 36 of the motor 24.

The switching unit 30 is configured to selectively connect, according to a received control signal originating from the control unit 31, each input stator winding 36 of the motor 24 to the corresponding output stator winding 42 or to the corresponding output 44 of the inverter 28.

For example, the switching member 30 is made by means of relays, contactors or electronic switches.

As described before, the control member 31 is configured to control switching of the switching member 30.

More specifically, the control member 31 is configured to receive speed information relating to a speed of the engine 18, and to deliver the control signal according to the speed information. For example, such speed information is the rotational speed of a shaft of the engine 18, in particular the drive shaft 37. According to another example, the speed of the engine information is information representative of a flight phase of the aircraft, or the piloting instructions of the aircraft.

The control member 31 is also configured to control the switching member 30 in order to connect each input stator winding 36 of the motor 24 to the corresponding output stator winding 42 of the generator 26 when it results from the speed information that the engine 18 is at a speed beyond a predetermined switching speed.

Furthermore, the control unit 31 is configured to control the switching unit 30 in order to connect each input stator winding 36 of the motor 24 to the corresponding output 44 of the inverter 28 when it results from the speed information that the engine 18 is in a speed below the predetermined switching speed.

The switching regime will now be described, with reference to FIG. 3.

Figure 1:
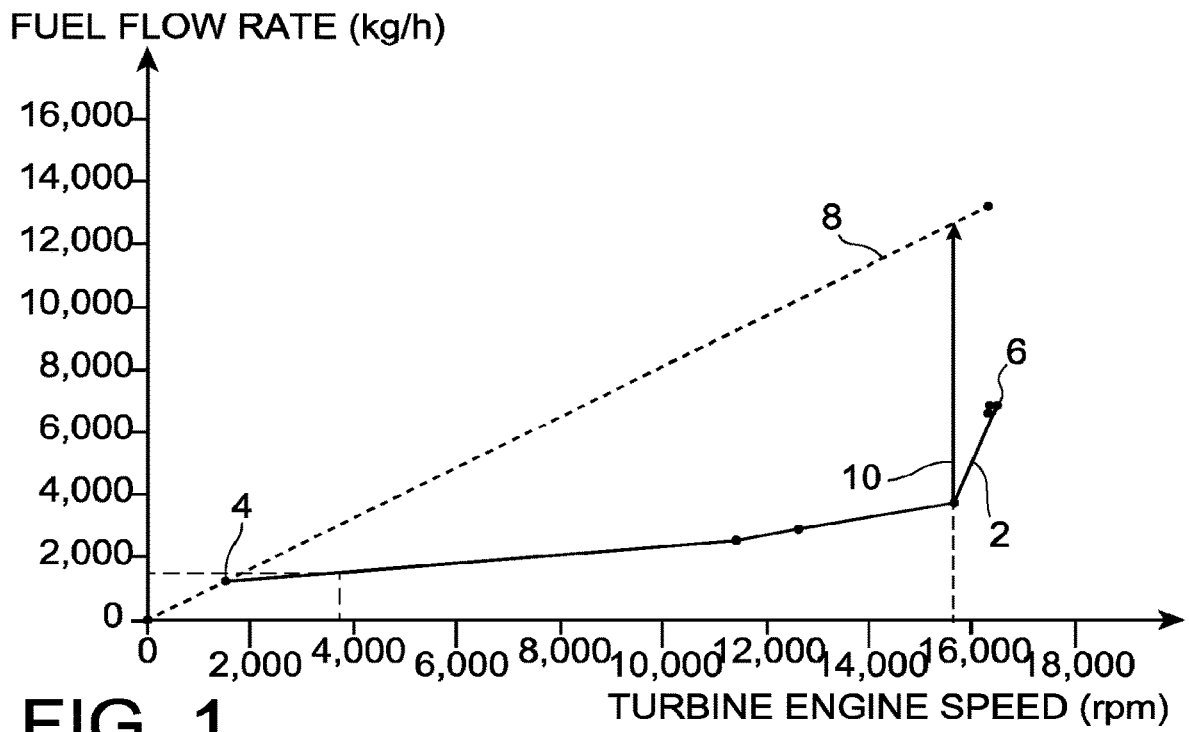
FIG. 1 is a graph representing the fuel need of an engine as a function of a rotational speed of its high-pressure shaft.
Figure 3:
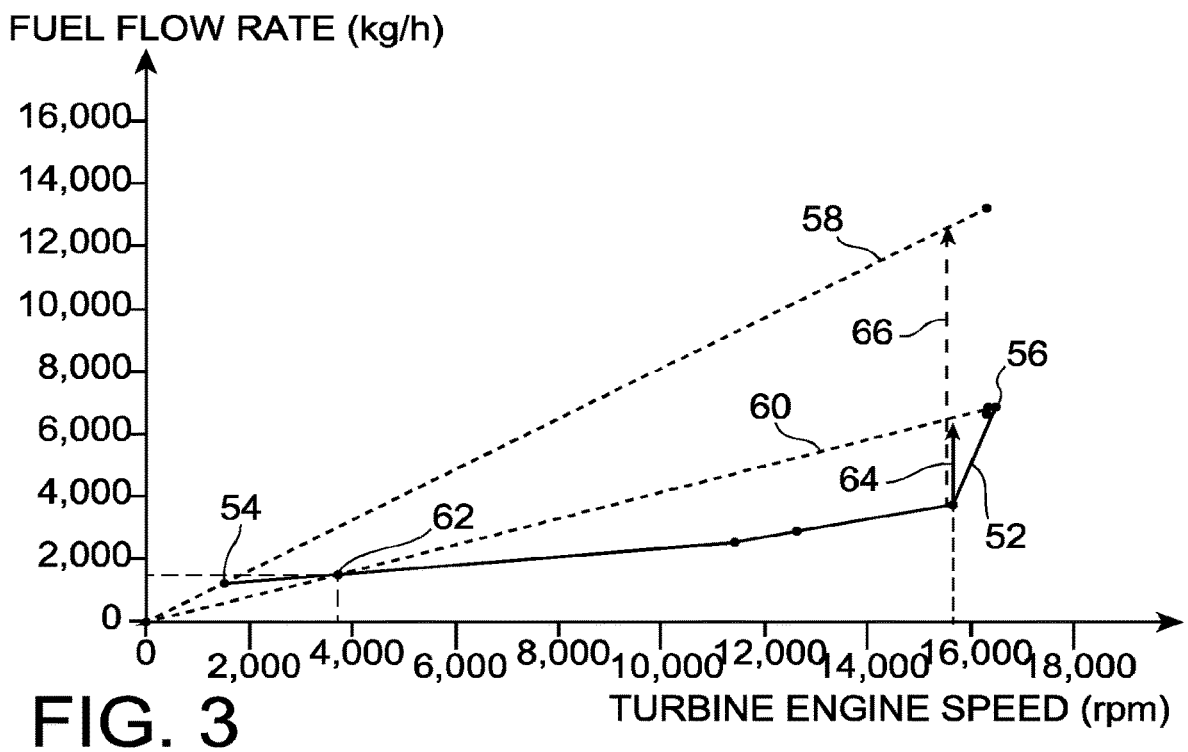
FIG. 3 is similar to FIG. 1, the evolution of the fuel flow rate supplied by the pumping system of FIG. 2 being also represented.

In this FIG. 3, the curve 52 represents the evolution of the fuel flow rate required by the engine 18 as a function of its speed. The curve 52 extends from the point 54, which is the lowest speed operating point of the engine 18, to the point 56, which is the highest speed operating point.

The point 54 is associated to an operating point for which the ratio of the required fuel flow rate to the speed of the engine 18 is higher than the ratio of the required fuel flow rate to the speed of the engine associated to the point 56.

As indicated before, such a curve is generally increasing with speed and substantially concave.

The line 58, which passes through the lowest speed operating point 54, represents the fuel flow rate of the pump 20 when:

each input stator winding 36 of the motor 24 is connected to the corresponding output stator winding 42 of the generator 26; and the displacement of the pump 20 is selected so that, at the point 54, the fuel flow rate supplied by the pump 20 is at least equal to the fuel flow rate required by the engine.

Furthermore, the line 60, which passes through the highest speed operating point 56, represents the fuel flow rate of the pump 20 when:

each input stator winding 36 of the motor 24 is connected to the corresponding output stator winding 42 of the generator 26; and the displacement of the pump 20 is selected so that, at the point 56, the fuel flow rate supplied by the pump 20 is at least equal to the fuel flow rate required by the engine 18.

As shown in FIG. 3, for any speed higher than the speed associated to the point 62 of intersection of the line 60 with the curve 52, the pump 20 is capable of supplying fuel to the engine 18 with a flow rate higher than or equal to the flow rate required by the engine. Said intersection point forms the switching point, the associated speed being called "switching speed".

It appears in this figure that, beyond the switching speed, the need for fuel recirculation when the pump 20 is driven to supply fuel to the injection device 16 with a flow rate that follows the line 60 (arrow 64) is significantly reduced compared to the need for fuel recirculation in the situation where the pump 20 is driven to supply fuel to the injection device 16 with a flow rate which follows the line 58 (arrow 66).

Alternatively, the switching speed is a predetermined speed distinct from the speed corresponding to the previously-described operating point 62.

Advantageously, the control member 31 is configured to control the operation of the inverter 28. In particular, the control member 31 is configured to control the operation of the inverter 28 according to a predetermined control law when the speed of the engine 18 is lower than the switching speed (i.e. the situation in which the control member 31 controls the switching member 30 so that each input stator winding 36 of the motor 24 is connected to the corresponding output 44 of the inverter 28).

More specifically, in this case, the control member 31 is configured to control the operation of the inverter 28 to cause it to deliver, at its outputs 44, currents intended to drive the motor 24 at a target rotational speed.

The target rotational speed is such that the pump 20, via the motor 24, delivers fuel to the engine 18 with a flow rate at least equal to the flow rate required by the engine 18, for the considered speed.

For this purpose, the control member 31 is configured, according to a first variant, to control the operation of the inverter 28 according to a so-called "speed regulated" mode.

More specifically, in the case of the speed regulated mode, the control member 31 is configured to receive, from an appropriate sensor (not represented), speed information relating to the speed at which the or each pump 20 is driven, for example information relating to the rotational speed of the first rotor 32 of the motor 24.

Furthermore, the control member 31 is configured to compare the measured drive speed, i.e. the current drive speed, with a target drive speed of the pump 20. For example, such a target drive speed follows a predetermined time profile, or is a predetermined constant.

The predetermined time profile and/or the predetermined constant depend on the current speed of the engine 18.

The controller 31 is also configured to control the inverter 28, based on the difference between the measured drive speed and the target drive speed of the pump 20, so as to reduce said difference. Hence, such a control consists of a closed-loop regulation.

In particular, the control unit 31 is configured to act on the frequency of the power supply voltage of the motor 24 by controlling the inverter 28 according to the difference between the measured drive speed and the target drive speed of the pump 20. Furthermore, the control unit 31 is configured to control the inverter 28 so as to act on the amplitude of the power supply voltage of the motor 24 according to a known so-called "V to f" control law, and that being so in order to ensure a constant magnetic flux at the air gap of the motor 24.

Advantageously, the control member 31 is also configured to control the inverter 28 in order to compensate for the stator resistance effect at low speed of the input stator windings 36, in order to improve the performances of the motor 24.

According to a second variant, in the absence of a rotational speed sensor of the first rotor 32, the control member 31 is configured to control the inverter 28 according to a so-called "fixed speed" mode.

More specifically, in the fixed speed mode, the control member 31 is configured to control the inverter 28 in order to deliver, to the motor 24, a power supply voltage whose frequency is predetermined. Furthermore, the control unit 31 is configured to control the inverter 28 so as to act on the amplitude of the power supply voltage of the motor 24 according to a known so-called "V to f" control low, and that being so in order to ensure a constant magnetic flux at the air gap of the motor 24.

For example, the control member 31 is configured so that the predetermined frequency of the power supply voltage of the motor 24 has a predetermined evolution over time.

Advantageously, the control member 31 is also configured to control the inverter 28 in order to compensate for the stator resistance effect at low speed of the input stator windings 36, in order to improve the performances of the motor 24.

Hence, it arises from the foregoing that, in each of the previously-described modes, the control member 31 is configured to control the inverter 28 with a predetermined control law which is dependent of the current speed of the engine 18.

The operation of the pumping system 12 will now be described.

During the operation of the engine 18, the control member 31 receives speed information relating to a speed of the engine 18.

If it follows from the speed information that the engine 18 is in a speed beyond the predetermined switching speed, then the control member 31 controls the switching member 30 in order to connect each input stator winding 36 of the motor 24 to the corresponding output stator winding 42 of the generator 26.

In this case, by sizing thereof, the pump 20, driven at a speed proportional to that of the engine, delivers fuel to the engine 18 at a flow rate at least equal to the fuel flow rate required by the engine.

Furthermore, if it follows from the speed information that the engine 18 is in a speed below the predetermined switching speed, then the control member 31 controls the switching member 30 in order to connect each input stator winding 36 of the motor 24 to the corresponding output 44 of the inverter 28.

In the latter case, the control member 31 also controls the inverter 28 so that the motor 24 drives the pump 20 at the target rotational speed corresponding to the speed of the engine, so that the pump 20 delivers fuel to the engine 18 at a flow rate at least equal to the fuel flow rate required by said engine 18.

The invention claimed is:

1. An actuating device intended to drive at least one pump of a system for pumping fuel from a fuel circuit towards a fuel injection device of an engine, the actuating device comprising a motor rotating electric machine, a generator rotating electric machine, an electrical energy inverter, a switching member and a control member,
    the motor rotating electric machine comprising a first rotor, intended to be mechanically coupled to the at least one pump for actuation thereof, and a first stator comprising at least one input stator winding,
    the generator rotating electric machine comprising a second rotor, intended to be mechanically coupled to a shaft of the engine forming a drive shaft, and a second stator comprising at least one output stator winding, each output stator winding being associated to a respective input stator winding of the motor rotating electric machine,
    the inverter comprising at least one output, each output of the inverter being associated to a respective input stator winding of the motor rotating electric machine,
    the control member being configured to receive speed information relating to a speed of the engine, and to control the switching member in order to selectively connect each input stator winding of the motor rotating electric machine:
    to the corresponding output stator winding if the speed of the engine is higher than or equal to a predetermined speed;
    at the corresponding output of the inverter, otherwise.

2. The actuating device according to claim 1, wherein the motor rotating electrical machine is an asynchronous machine, and/or the generator rotating electric machine is a permanent magnet synchronous machine or an asynchronous machine.

3. The actuating device according to claim 1, wherein the control member is configured to control the operation of the inverter according to a predetermined control law dependent of the speed of the engine.

4. The actuating device according to claim 3, wherein the control member is configured to receive speed information relating to a current drive speed at which each pump is driven, the control member also being configured, when the speed of the engine is lower than the predetermined speed, to:
    compare the current drive speed with a predetermined target drive speed;
    control the inverter in order to deliver, for each corresponding input stator winding, a voltage whose frequency and amplitude depend, each, on a difference between the current drive speed and the target drive speed.

5. The actuating device according to claim 4, wherein the target drive speed follows a predetermined time profile, or is a predetermined constant.

6. The actuating device according to claim 4, wherein the control member is configured to control the inverter according to a so-called "V to f" control law.

7. The actuating device according to claim 3, wherein the control member is configured to control the inverter so that a frequency of a power supply voltage of the motor rotating electric machine delivered by the inverter has a predetermined evolution over time.

8. A fuel pumping system comprising at least one pump and an actuating device according to claim 1, the first rotor of the motor rotating electric machine being mechanically coupled to each pump for its actuation thereof.

9. An aircraft carrying a fuel pumping system according to claim 8, each pump being inserted between a fuel circuit of the aircraft and a fuel injection member of an engine of the aircraft, the second rotor of the generator rotating electric machine being mechanically coupled to a shaft of the engine.

10. A method of supplying fuel to an engine of an aircraft according to claim 9, the supply method including the selective connection of each input stator winding of the motor rotating electric machine:
- to the corresponding output stator winding if the speed of the engine is higher than or equal to a predetermined speed;
- at the corresponding output of the inverter, otherwise.

\* \* \* \* \*